Nov. 15, 1927.
E. B. POWELL ET AL
1,649,041
CONVEYING APPARATUS
Filed Aug. 4, 1925
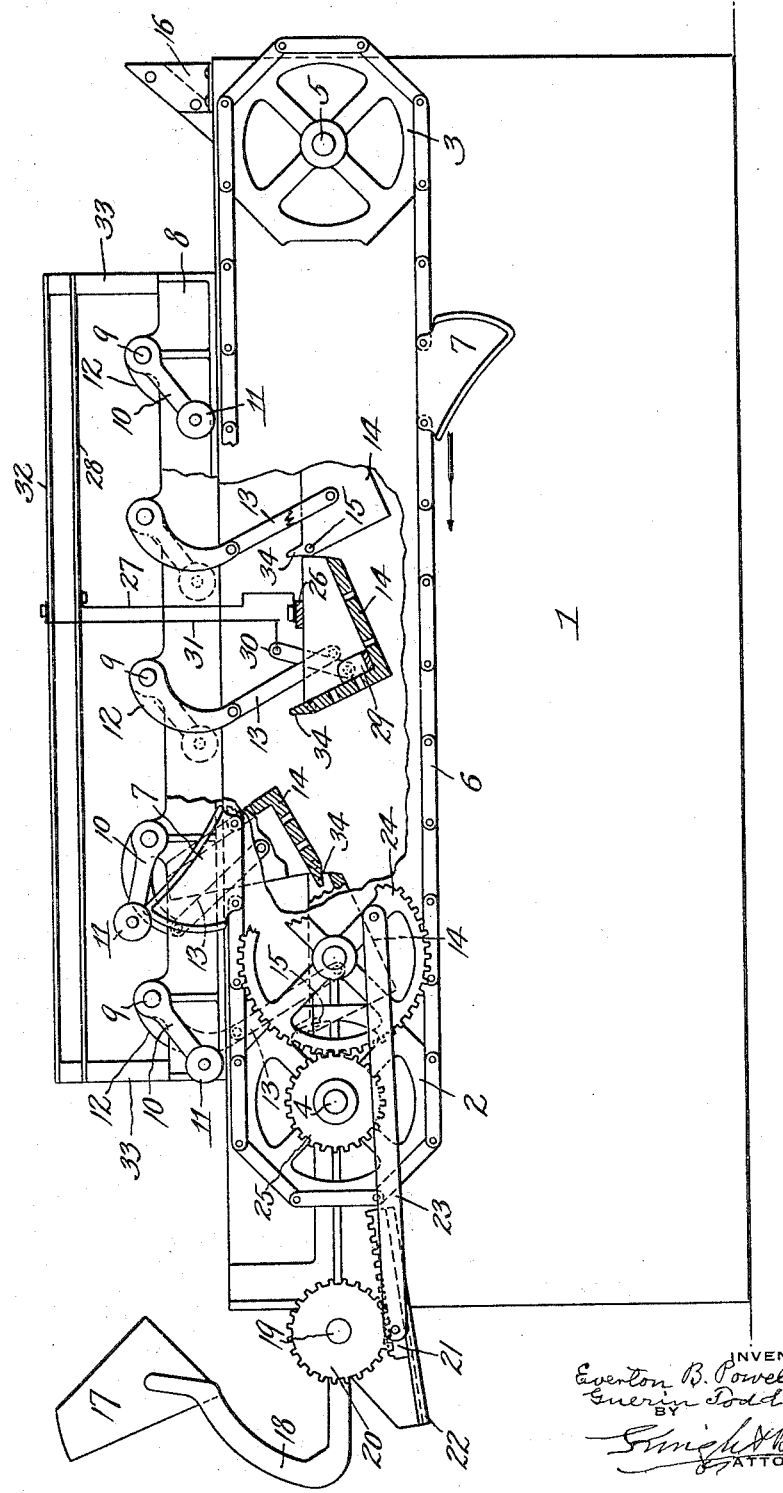

Patented Nov. 15, 1927.

1,649,041

UNITED STATES PATENT OFFICE.

EVERTON B. POWELL, OF NEWARK, AND GUERIN TODD, OF MILLBURN, NEW JERSEY, ASSIGNORS TO THE HANSON & VAN WINKLE COMPANY, OF NEWARK, NEW JERSEY, A CORPORATION OF NEW JERSEY.

CONVEYING APPARATUS.

Application filed August 4, 1925. Serial No. 48,072.

This invention relates to conveying mechanism for transferring loose articles in bulk from one place to another and more particularly relates to mechanism for use in connection with electroplating baths, and has for its object the mechanical handling of the articles to be plated through the bath by means of a series of troughs or trays, the articles being dumped in succession from one trough to the next throughout the length of the bath the last trough acting to discharge the articles into a suitable receptacle. The invention will best be understood by a description in connection with the accompanying drawing, which shows in side elevation and partial section an electroplating machine involving the present invention.

A vat or tank 1 has mounted adjacent to its sides two sprocket wheels 2 and 3 journalled on suitable shafts 4 and 5. Over these sprocket wheels a sprocket chain 6 is carried and one or more of the links of this chain carry cam lifters 7. A frame 8 mounted near to or upon the tank forms a support for shafts 9 and these shafts have crank arms 10 at one end with a roller 11 at the end of the crank arm adapted to engage with the cam lifter 7. The shafts 9 also carry other crank arms 12, the outer ends of which are connected by means of connecting rods 13 to troughs 14. These troughs are located in the electrolyte and are pivoted at one side as at 15, the other side of the trough abutting against the pivot of the next adjacent trough. The troughs 14 form a series of juxtaposed buckets, the series reaching from one end of the tank to the other. At the incoming end there is a chute 16 upon which articles to be placed are dumped and this chute discharges into the first trough of the series. The last trough of the series shown at 17 is carried by rocker arms 18, which in turn are secured to a shaft 19. The shaft 19 has a gear 20 operated by a rack 21 reciprocated on a slightly inclined support 22 by means of a connecting rod 23 which connects the rack with a wheel 24. The wheel 24 is geared in the ratio of two to one or any other desired ratio to a gear 25 on the shaft 4 so that the gear 24 will turn once for every two revolutions of the gear 25. Anode bars 26 may be located at any suitable place as for example on the top of the troughs as shown in which case they may be connected by flexible conductor 27 to an anode terminal bar 28. Cathodes 29 may be in the form of bars or studs fastened to the lower inside part of the troughs with connecting pieces 30 outside the troughs connected by flexible conductors 31 to cathode terminal bars 32. The articles to be plated will naturally lay together in the bottom of the trough and will so rest in contact with the cathodes. The terminal bars may be supported by any suitable insulation as shown at 33. The operation of the machine is as follows:—

Either shaft 4 or 1 or the sprocket chain being propelled by any suitable motive power, the lifting cam 7 will, traveling in the direction of the arrow, cause the rocker arms 10 to lift the rocking troughs one after the other from left to right. As each trough is lifted, it will dump its contents into the adjacent trough to the left and will then be lowered back into place to be in turn supplied by the dumping of the next trough ahead. The last dumping is made into the last trough 17 which at periodic intervals is in turn lifted up by means of the gears 25, 24, connecting rod 23, rack 21, gear 20, shaft 19, and rocker arms 18, until it is in the position shown in the drawings to discharge its contents into any suitable receptacle. It is then automatically lowered into its position at the end of the series to again be filled in turn at the proper time. The connection mechanism is so designed that this final dumping takes place when the cams are operating other troughs than the last one in the series. The troughs themselves, owing to their simple construction, may be of earthenware and may have suitable perforations to allow the circulation of the electrolyte. It is also desirable to have the rear end of the trough extend beyond the pivot as shown at 34 so as to form a lip to guide the articles onto the next trough without any danger of their being caught in between the troughs. From the above description it will be seen that the articles are cascaded in an intermittent manner from the receiving to the delivering end of the vat, with one and only one trough empty at a time and that one immediately adjacent the one that is being dumped.

It will also be seen that the articles are transferred with the minimum amount of injury as they will slide gently from one trough to the next just as the inclination reaches the sliding angle.

While we have shown as an example an electroplating machine that carries out our invention we do not wish to be limited in our claims to the specific features shown therein as there are many modifications of the elements of the invention that will occur to those skilled in the art.

We claim:—

1. A conveyer for loose articles, comprising a horizontal train of juxtaposed pivoted troughs, each trough being provided with tipping means, and mechanism movable longitudinally of the conveyer adapted to engage in succession the said tipping means whereby the articles may be dumped from trough to trough to transfer them from one end of the conveyer to the other.

2. A conveyer for loose articles, comprising a horizontal train of juxtaposed pivoted troughs, each trough being provided with tipping means, and mechanism movable longitudinally of the conveyer adapted to engage in succession the said tipping means whereby the articles may be dumped from trough to trough to transfer them from one end of the conveyer to the other, and a pivoted delivery trough tipped by the said mechanism to a discharge position once for each time the train of troughs is operated.

3. In apparatus for coating articles handled in bulk, the combination comprising a vat, a series of juxtaposed troughs pivoted in the vat, crank arms on each trough, means movable longitudinally along the vat for engaging said crank arms and tipping the troughs in succession to tumble the articles from trough to trough to transfer them from one end of the vat to the other.

4. In apparatus for coating articles handled in bulk, the combination comprising a vat, a series of juxtaposed troughs pivoted in the vat, crank arms on each trough, means movable longitudinally along the vat for engaging said crank arms and tipping the troughs in succession to tumble the articles from trough to trough to transfer them from one end of the vat to the other, and a pivoted delivery trough geared to said tipping means to operate once for each time the series is operated to discharge the articles from the vat.

EVERTON B. POWELL.
GUERIN TODD.